United States Patent
Otake et al.

(10) Patent No.: US 12,466,367 B2
(45) Date of Patent: Nov. 11, 2025

(54) VEHICLE BRAKE DEVICE

(71) Applicant: ADVICS CO., LTD., Kariya (JP)

(72) Inventors: Tsuyoshi Otake, Kariya (JP); Atsushi Takahashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 183 days.

(21) Appl. No.: 18/249,408

(22) PCT Filed: Oct. 26, 2021

(86) PCT No.: PCT/JP2021/039532
§ 371 (c)(1),
(2) Date: Apr. 18, 2023

(87) PCT Pub. No.: WO2022/092102
PCT Pub. Date: May 5, 2022

(65) Prior Publication Data
US 2024/0109523 A1 Apr. 4, 2024

(30) Foreign Application Priority Data
Oct. 30, 2020 (JP) ................................ 2020-183193

(51) Int. Cl.
*B60T 8/17* (2006.01)
*B60T 8/34* (2006.01)
(Continued)

(52) U.S. Cl.
CPC ................ *B60T 8/17* (2013.01); *B60T 8/343* (2013.01); *B60T 8/368* (2013.01); *B60T 11/203* (2013.01); *B60T 13/662* (2013.01)

(58) Field of Classification Search
CPC . B60T 8/17; B60T 8/343; B60T 8/368; B60T 11/203; B60T 13/662; B60T 13/745
See application file for complete search history.

(56) References Cited

U.S. PATENT DOCUMENTS 5,362,137 A * 11/1994 Kohno ................... B60T 8/368
303/119.3
2004/0207256 A1* 10/2004 Volz .................... F15B 13/0832
303/DIG. 10
(Continued)

FOREIGN PATENT DOCUMENTS

DE 102010020002 A1 11/2011
JP H06122362 A 5/1994
(Continued)

OTHER PUBLICATIONS

International Search Report (PCT/ISA/210) with translation and Written Opinion (PCT/ISA/237) mailed on Dec. 28, 2021, by the Japan Patent Office as the International Searching Authority for International Application No. PCT/JP2021/039532. (9 pages).

*Primary Examiner* — John M Zaleskas
(74) *Attorney, Agent, or Firm* — BUCHANAN INGERSOLL & ROONEY PC

(57) ABSTRACT

A vehicle brake device includes a first electric motor, a first electrically powered cylinder device, a first electromagnetic valve, and a first pressure sensor serving as first elements, a second electric motor, a second electrically powered cylinder device, a second electromagnetic valve, and a second pressure sensor serving as second elements, and a circuit board in which a first sector in which a first circuit for controlling the first element is formed and a second sector in which a second circuit for controlling the second element is formed are arranged side by side. In the vehicle brake device, the first element controlled only by the first circuit is disposed so as to face the first sector, and the second element controlled only by the second circuit is disposed so as to face the second sector.

2 Claims, 3 Drawing Sheets

(51) Int. Cl.
 *B60T 8/36* (2006.01)
 *B60T 11/20* (2006.01)
 *B60T 13/66* (2006.01)

(56) References Cited

U.S. PATENT DOCUMENTS

| | | | | |
|---|---|---|---|---|
| 2005/0265852 | A1* | 12/2005 | Nakazawa | B60T 8/368 417/63 |
| 2008/0036291 | A1* | 2/2008 | Sakai | B60T 8/368 303/11 |
| 2008/0036292 | A1* | 2/2008 | Sakai | B60T 8/368 303/11 |
| 2008/0036295 | A1* | 2/2008 | Sakai | B60T 13/18 303/113.1 |
| 2009/0096283 | A1* | 4/2009 | Nishikawa | B60T 17/18 303/122.05 |
| 2009/0195060 | A1* | 8/2009 | Nishikawa | B60T 8/3225 303/116.1 |
| 2013/0207452 | A1* | 8/2013 | Gilles | B60T 8/17 303/9.62 |
| 2015/0123459 | A1* | 5/2015 | Otake | B60T 8/3225 303/9.61 |
| 2016/0059835 | A1* | 3/2016 | Gilles | B60T 8/368 303/3 |
| 2018/0050670 | A1* | 2/2018 | Feigel | B60T 13/662 |
| 2018/0281766 | A1* | 10/2018 | Gilles | B60T 8/4018 |
| 2018/0290640 | A1* | 10/2018 | Johnson | B60T 13/662 |
| 2018/0334149 | A1* | 11/2018 | Feigel | B60T 13/662 |
| 2019/0031165 | A1* | 1/2019 | Besier | B60T 8/348 |
| 2019/0202425 | A1* | 7/2019 | Feigel | H02K 11/33 |
| 2019/0217837 | A1* | 7/2019 | Feigel | B60T 13/686 |
| 2020/0031322 | A1* | 1/2020 | Satoh | B60T 1/065 |
| 2020/0039484 | A1* | 2/2020 | Satoh | B60T 7/042 |
| 2020/0114888 | A1* | 4/2020 | Michels | B60T 8/4077 |
| 2020/0139946 | A1* | 5/2020 | Gabbianelli | B60T 13/586 |
| 2021/0009096 | A1* | 1/2021 | Mahnkopf | B60T 13/662 |
| 2021/0122339 | A1* | 4/2021 | Kuzuya | B60T 8/404 |
| 2021/0380087 | A1* | 12/2021 | Di Stefano | B60T 7/12 |
| 2022/0105907 | A1* | 4/2022 | Feigel | B60T 13/662 |
| 2022/0212639 | A1* | 7/2022 | Takahashi | B60T 13/686 |
| 2022/0227340 | A1* | 7/2022 | Kim | B60T 7/042 |
| 2022/0242379 | A1* | 8/2022 | Kim | B60T 7/042 |
| 2022/0314813 | A1* | 10/2022 | Koglsperger | B60T 13/146 |
| 2022/0340112 | A1* | 10/2022 | Kim | H02K 7/102 |
| 2022/0340113 | A1* | 10/2022 | Kim | H02K 11/33 |
| 2023/0103320 | A1* | 4/2023 | Yabusaki | B60T 13/148 188/72.4 |
| 2023/0286479 | A1* | 9/2023 | Takahashi | B60T 13/148 |
| 2023/0391307 | A1* | 12/2023 | Otake | B60T 8/4031 |
| 2024/0416885 | A1* | 12/2024 | Otake | B60T 13/662 |
| 2024/0416886 | A1* | 12/2024 | Otake | B60T 13/20 |

FOREIGN PATENT DOCUMENTS

| | | | | |
|---|---|---|---|---|
| JP | | 2008030570 | A * | 2/2008 |
| JP | | 2018149998 | A * | 9/2018 |
| WO | WO-2015032637 | A1 * | 3/2015 | ............ B60T 8/4081 |
| WO | WO-2019027030 | A1 * | 2/2019 | |
| WO | WO-2020036008 | A1 * | 2/2020 | |

* cited by examiner

VEHICLE BRAKE DEVICE

TECHNICAL FIELD

The present disclosure relates to a vehicle brake device.

BACKGROUND ART

A vehicle brake device pump disclosed in Patent Literature 1, for example, is conventionally known. The conventional vehicle brake device includes two electronic control units (ECU), and includes an electric motor, an electrically powered cylinder device, various electromagnetic valves, and the like controlled by the respective ECUs.

CITATIONS LIST

Patent Literature

Patent Literature 1: German Patent Application Publication No. 102010020002

SUMMARY

Technical Problems

The conventional vehicle brake device described above includes an electric motor, an electrically powered cylinder device, various electromagnetic valves, and the like in correspondence with each of the two ECUs. That is, the conventional vehicle brake device has redundancy, and each of the two ECUs controls the corresponding electric motor, electrically powered cylinder device, various electromagnetic valves, and the like.

As in the conventional vehicle brake device, in a case where an independent electric motor, an electrically powered cylinder device, various electromagnetic valves, and the like are provided in correspondence with each of the two ECUs in order to have redundancy, the vehicle brake device becomes large as the number of components increases. In addition, in a limited space of the vehicle brake device, various electromagnetic valves and the like controlled by each ECU need to be arranged so as to exhibit their respective functions. Therefore, various electromagnetic valves and the like may be disposed at positions away from the corresponding ECUs. In this case, in order to electrically connect each of the two ECUs to various electromagnetic valves and the like, for example, the shape of the circuit board including the ECU and the electric circuit may become complicated or increase in size, and as a result, the vehicle brake device becomes large.

The present disclosure has been made to solve the above problems, and an object thereof is to provide a vehicle brake device that can be reduced in size.

Solutions to Problems

A vehicle brake device according to the present disclosure includes an electric first element that adjusts braking force applied to a first wheel of a vehicle; an electric second element that adjusts braking force applied to a second wheel of the vehicle; and a circuit board on which an electric circuit that controls the first element and the second element is formed, and a first sector in which a first circuit that controls the first element is formed in the electric circuit and a second sector in which a second circuit that controls the second element is formed in the electric circuit are arranged; where the first element controlled only by the first circuit is arranged to face the first sector, and the second element controlled only by the second circuit is arranged to face the second sector.

Advantageous Effects

According to the vehicle brake device of the present disclosure, the first element is disposed so as to face the first sector in which the first circuit is formed, and the second element is disposed so as to face the second sector in which the second circuit is formed. As a result, the first element electrically connected to and controlled by the first circuit can be disposed close to the first circuit, and the second element electrically connected to and controlled by the second circuit can be disposed close to the second circuit. That is, the distance between the first circuit and the first element can be shortened in the first sector, and the distance between the second circuit and the second element can be shortened in the second sector.

DESCRIPTION OF EMBODIMENT

Hereinafter, an embodiment of the present disclosure will be described with reference to the drawings. Note that the drawings used in the following description of the embodiment are conceptual diagrams, and the shape of each part may not necessarily be exact in some cases.

1. Configuration of Vehicle Brake Device 10

Figure 1:
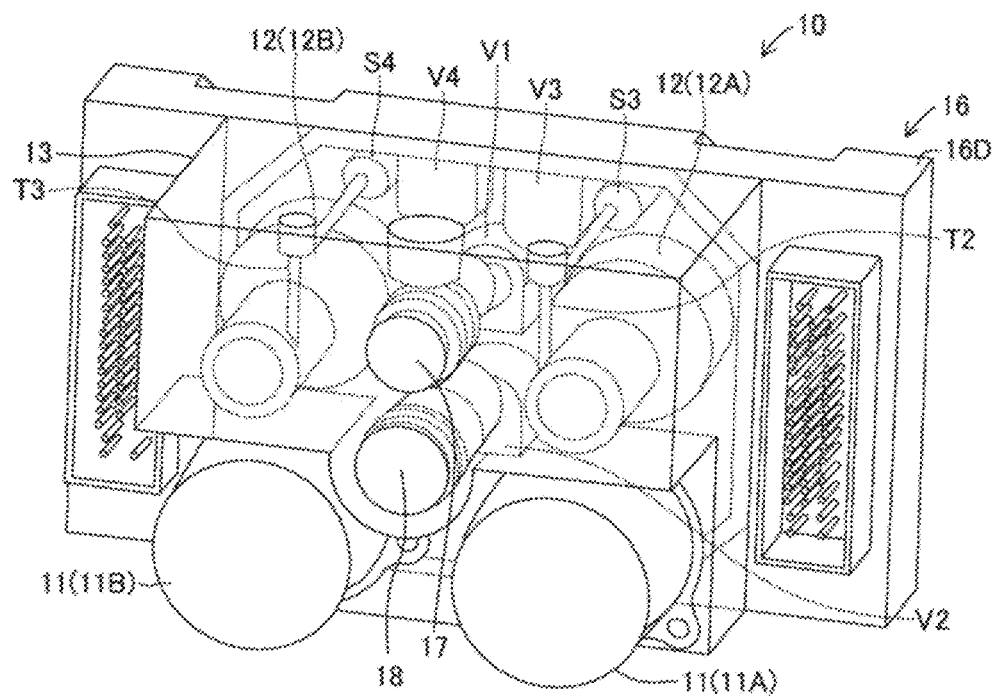
FIG. 1 is a perspective view illustrating a configuration of a vehicle brake device according to an embodiment of the present disclosure.
Figure 2:
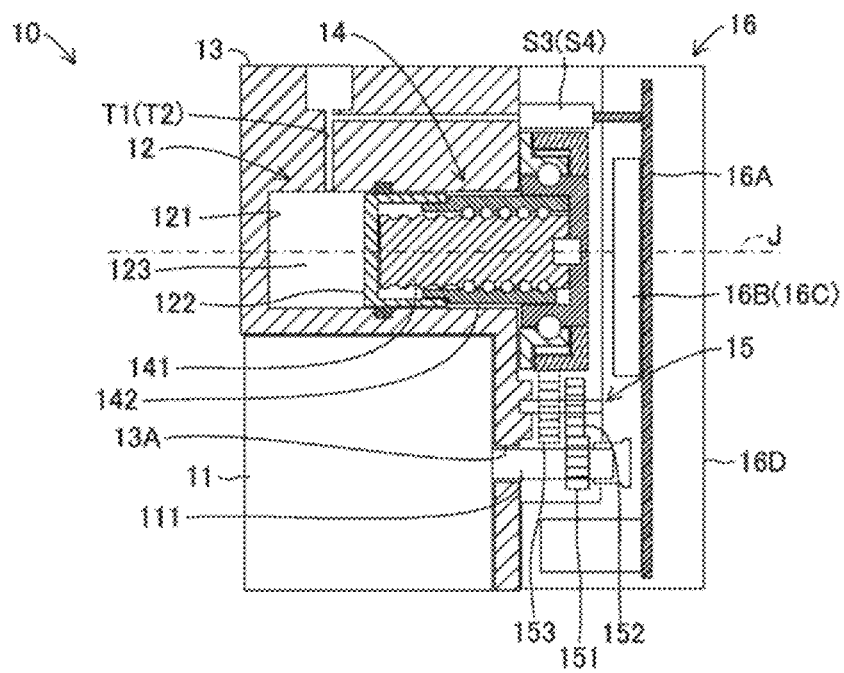
FIG. 2 is a cross-sectional view for explaining in detail the configuration of the vehicle brake device.

A configuration of the vehicle brake device 10 of the present embodiment will be described in detail. As illustrated in FIG. 1, the vehicle brake device 10 includes two electric motors 11, two electrically powered cylinder devices 12, a hydraulic block 13, a control unit 16, a master cylinder 17, and a stroke simulator 18. As illustrated in FIG. 2, the vehicle brake device 10 of the present embodiment includes a linear motion conversion mechanism 14 and a power transmission unit 15. Note that in the following description, when the two electric motors 11 and the two electrically powered cylinder devices 12 are distinguished as a "first element" and a "second element", respectively, the electric motor 11 is referred to as a "first electric motor 11A" of the first element and a "second electric motor 11B" of the second element, and the electrically powered cylinder device 12 is referred to as a "first electrically powered cylinder device 12A" of the first element and a "second electrically powered cylinder device 12B" of the second element.

Here, as illustrated in FIG. 1, the vehicle brake device 10 of the present embodiment includes a first electric motor 11A and a second electric motor 11B, and a first electrically powered cylinder device 12A and a second electrically powered cylinder device 12B driven by the first electric motor 11A and the second electric motor 11B, respectively. That is, the vehicle brake device 10 includes the first electrically powered cylinder device 12A driven by the first electric motor 11A and the second electrically powered cylinder device 12B driven by the second electric motor 11B. As described above, in the vehicle brake device 10, each of the first electric motor 11A and the first electrically powered cylinder device 12A, and the second electric motor 11B and the second electrically powered cylinder device 12B are provided as a pair, and each pair has redundancy that can independently generate the braking fluid pressure.

Figure 3:
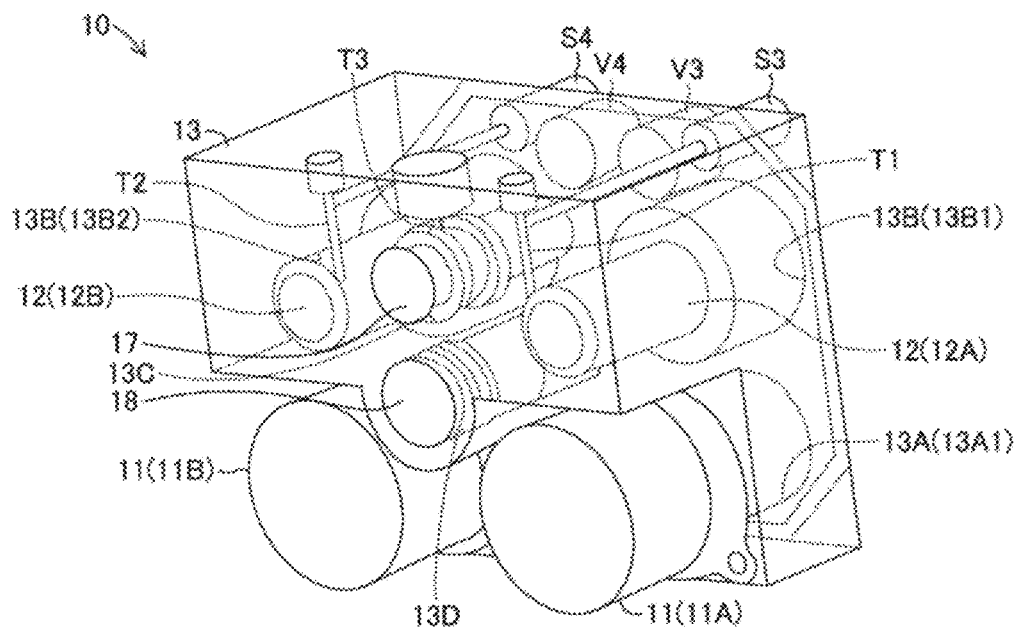
FIG. 3 illustrates a configuration of a hydraulic block forming the vehicle brake device and is a perspective view when the vehicle brake device is viewed from a side on which an electric motor is assembled.

As illustrated in FIG. 2, the two electric motors 11 (the first electric motor 11A and the second electric motor 11B) and the two electrically powered cylinder devices 12 (the first electrically powered cylinder device 12A and the second electrically powered cylinder device 12B) are attached to the hydraulic block 13 such that axes of the rotating shaft 111 of the electric motor 11 and the cylinder 121 (the electrically powered cylinder device 12) are parallel to each other. Here, as illustrated in FIG. 3, in the vehicle brake device 10, in a posture mounted on the vehicle, the electric motor 11 is disposed on the rear side in the vehicle front-rear direction, specifically, on a surface side facing a partition wall (also referred to as a dashboard, a dash panel, or a dash cowl) of the vehicle in the hydraulic block 13. Furthermore, the electrically powered cylinder device 12 is accommodated inside the hydraulic block 13 so as to be on the rear side in the vehicle front-rear direction.

Figure 4:
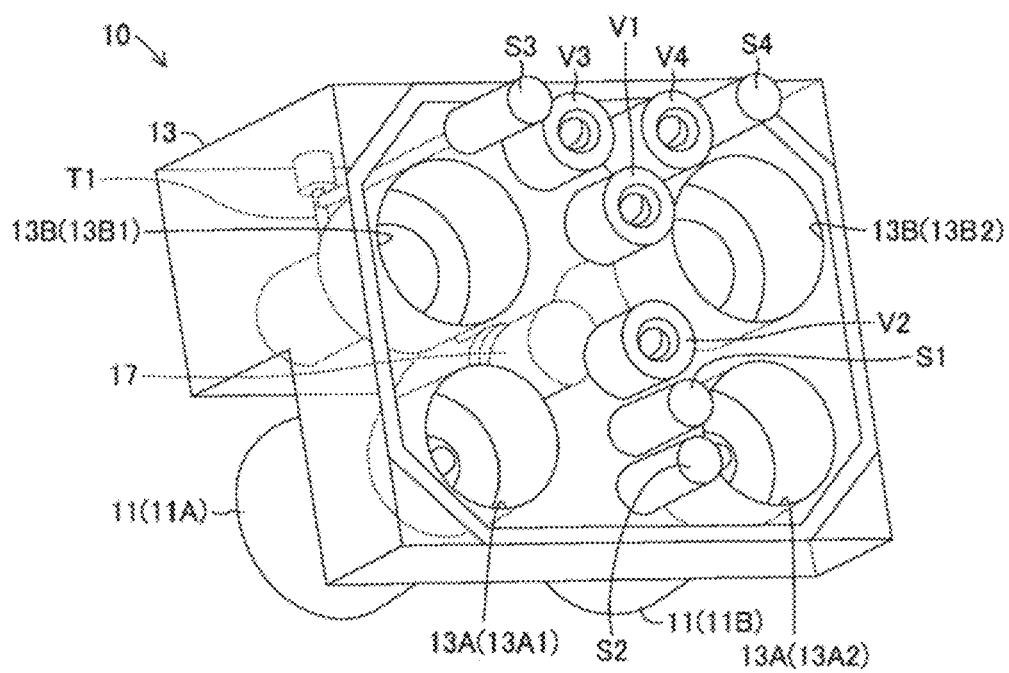
FIG. 4 illustrates a configuration of a hydraulic block forming the vehicle brake device and is a perspective view when the vehicle brake device is viewed from a side on which a control unit is assembled.

The electric motor 11 generates a rotational driving force to drive the electrically powered cylinder device 12, and has a rotating shaft 111, as illustrated in FIG. 2. As illustrated in FIG. 4, the rotating shaft 111 enters into a rotating shaft accommodating portion 13A formed in the hydraulic block 13 to be described later, and supplies rotational motion (rotational driving force) to the electrically powered cylinder device 12.

As illustrated in FIG. 2, the electrically powered cylinder device 12 mainly includes a cylinder 121, a piston 122, and a fluid pressure chamber 123. The cylinder 121 is assembled inside the hydraulic block 13. Each cylinder 121 is connected to a reservoir (not illustrated) by way of a liquid path T1 and a liquid path T2, and slidably accommodates the piston 122 therein. Here, the cylinders 121 (the electrically powered cylinder device 12) are arranged side by side in the radial direction with axes J thereof being parallel to each other (see, e.g., FIG. 1). The piston 122 is coaxially coupled to the linear motion conversion mechanism 14, and moves in the axial direction of the cylinder 121 together with a ball screw 141, described later, which is a linear moving portion. The fluid pressure chamber 123 is formed by the inner peripheral surface of the cylinder 121 and the piston 122.

As a result, in the fluid pressure chamber 123, the brake fluid is pressurized with the movement of the piston 122 in the compressing direction (left direction in FIG. 2), and the braking fluid pressure corresponding to the position of the piston 122 is generated. The braking fluid pressure generated in the fluid pressure chamber 123 is supplied to wheel cylinders provided in the first wheel (e.g., the left front wheel of the vehicle) and the second wheel (e.g., the right front wheel of the vehicle) via a liquid path (not illustrated) formed in the hydraulic block 13.

As illustrated in FIGS. 3 and 4, in the hydraulic block 13, two rotating shaft accommodating portions 13A corresponding to the two electric motors 11 (the first electric motor 11A and the second electric motor 11B) on a one-to-one basis are formed. The rotating shaft 111 of the corresponding electric motor 11 is inserted into and accommodated in the rotating shaft accommodating portion 13A. Here, the rotating shaft accommodating portion 13A is formed such that the rotating shaft 111 is parallel to the axis J of the electrically powered cylinder device 12, and the first electric motor 11A and the second electric motor 11B are arranged side by side in the radial direction. When the rotating shaft accommodating portion 13A is distinguished in the following description, the rotating shaft accommodating portion 13A accommodating the rotating shaft 111 of the first electric motor 11A is referred to as a "first rotating shaft accommodating portion 13A1", and the rotating shaft accommodating portion 13A accommodating the rotating shaft 111 of the second electric motor 11B is referred to as a "second rotating shaft accommodating portion 13A2".

In the hydraulic block 13, two cylinder accommodating portions 13B corresponding to the two electrically powered cylinder devices 12 (more specifically, the cylinder 121 of the first electrically powered cylinder device 12A and the cylinder 121 of the second electrically powered cylinder device 12B) on a one-to-one basis are formed. The cylinder accommodating portion 13B accommodates the corresponding electrically powered cylinder device 12. When the cylinder accommodating portion 13B is distinguished in the following description, the cylinder accommodating portion 13B accommodating the cylinder 121 of the first electrically powered cylinder device 12A is referred to as a "first cylinder accommodating portion 13B1", and the cylinder accommodating portion 13B accommodating the cylinder 121 of the second electrically powered cylinder device 12B is referred to as a "second cylinder accommodating portion 13B2".

Here, the rotating shaft accommodating portion 13A and the cylinder accommodating portion 13B are formed so as to be parallel to each other and not to be coaxial with each other. The first rotating shaft accommodating portion 13A1 and the second rotating shaft accommodating portion 13A2 are disposed apart from each other in the hydraulic block 13. Similarly, the first cylinder accommodating portion 13B1 and the second cylinder accommodating portion 13B2 are disposed apart from each other in the hydraulic block 13. That is, in the hydraulic block 13, as illustrated in FIGS. 3 and 4, a central portion for arranging the master cylinder 17 and the stroke simulator 18 is formed.

As a result, as illustrated in FIG. 3, a master cylinder accommodating portion 13C for accommodating the master cylinder 17 and a stroke simulator accommodating portion 13D for accommodating the stroke simulator 18 are formed at the central portion of the hydraulic block 13. As illustrated in FIG. 4, a master cut valve V1 and a simulator cut valve V2 are assembled to the central portion of the hydraulic block 13. In addition, a master pressure sensor S1 and a master pressure sensor S2 are assembled, and a stroke sensor (not illustrated) is assembled to the central portion of the hydraulic block 13. Note that in the present embodiment, the master pressure sensors S1 and S2 are provided to have redundancy. However, if necessary, one master pressure sensor and one stroke sensor can be provided to have redundancy.

That is, the master cylinder 17, the stroke simulator 18, the master cut valve V1, the simulator cut valve V2, the master pressure sensors S1, S2 and the stroke sensor assembled to the central portion of the hydraulic block 13 are arranged at a boundary (alternatively, a region between the first region R1 and the second region R2) between a first region R1 including a first sector K1 and a second region R2 including a second sector K2 in the control unit 16 to be described later.

Furthermore, as illustrated in FIG. 4, in the hydraulic block 13, a first electromagnetic valve V3 and a first pressure sensor S3 serving as first elements are assembled in the first region R1, described later, which is located on the peripheral edge portion side than the central portion and in which the first electric motor 11A and the first electrically powered cylinder device 12A are disposed. In addition, in the hydraulic block 13, a second electromagnetic valve V4 and a second pressure sensor S4 serving as second elements are assembled in the second region R2, described later, which is located on the peripheral edge portion side than the central portion and in which the second electric motor 11B and the second electrically powered cylinder device 12B are disposed. That is, the first rotating shaft accommodating portion 13A1 of the hydraulic block 13 in which the rotating shaft 111 of the first electric motor 11A is accommodated, the first cylinder accommodating portion 13B1 in which the cylinder 121 of the first electrically powered cylinder device 12A is accommodated, the first electromagnetic valve V3, and the first pressure sensor S3 are disposed in the first region R1. The second rotating shaft accommodating portion 13A2 of the hydraulic block 13 in which the rotating shaft 111 of the second electric motor 11B is accommodated, the second cylinder accommodating portion 13B2 in which the cylinder 121 of the second electrically powered cylinder device 12B is accommodated, the second electromagnetic valve V4, and the second pressure sensor S4 are disposed in the second region R2.

As will be described later, the master cut valve V1 switches communication or cut-off between the master cylinder 17 accommodated in the hydraulic block 13 and the first wheel (e.g., the left front wheel of the vehicle) and the second wheel (e.g., the right front wheel of the vehicle) of the vehicle according to the energization state from the control unit 16. The simulator cut valve V2 cuts off the master cylinder 17 and the stroke simulator 18 in a case where the master cut valve V1 is in the communicating state and communicates the master cylinder 17 and the stroke simulator 18 in a case where the master cut valve V1 is in the cutoff state according to the energization state from the control unit 16. Here, the master cut valve V1 and the simulator cut valve V2 are controlled by both the first ECU 16B and the second ECU 16C configuring the control unit 16 as will be described later. Therefore, the master cut valve V1 and the simulator cut valve V2 correspond to a "third element".

The first electromagnetic valve V3 is disposed in a liquid path connecting the first electrically powered cylinder device 12A and a wheel cylinder provided on the first wheel (e.g., the left front wheel of the vehicle), and switches communication or cut-off between the first electrically powered cylinder device 12A and the wheel cylinder according to the energization state from the control unit 16. The second electromagnetic valve V4 is disposed in a liquid path connecting the second electrically powered cylinder device 12B and a wheel cylinder provided on the second wheel (e.g., the right front wheel of the vehicle), and switches communication or cut-off between the second electrically powered cylinder device 12B and the wheel cylinder according to an energization state from the control unit 16.

The master pressure sensors S1 and S2 detect the braking fluid pressure (master pressure) generated by the master cylinder 17 and output the braking fluid pressure to the control unit 16. A stroke sensor (not illustrated) detects a stroke amount that can be detected as an operation amount of a brake operation member (e.g., a brake pedal etc.) (not illustrated) operated by a driver, and outputs the detected stroke amount to the control unit 16. Here, the master pressure sensors S1 and S2 and the stroke sensor are electrically connected to each of the first ECU 16B and the second ECU 16C configuring the control unit 16. The first ECU 16B and the second ECU 16C acquire detection values from the master pressure sensors S1 and S2 and the stroke sensor. One master pressure sensor and one stroke sensor may be provided, and one master pressure sensor and one stroke sensor may be electrically connected to the first ECU 16B and the second ECU 16C. In this case, the master pressure sensor and the stroke sensor electrically connected to the first ECU 16B and the second ECU 16C correspond to the "third element".

The first pressure sensor S3 detects a braking fluid pressure generated by the first electrically powered cylinder device 12A connected to the first wheel of the vehicle and outputs the braking fluid pressure to the control unit 16. The second pressure sensor S4 detects a braking fluid pressure generated by the second electrically powered cylinder device 12B connected to the second wheel of the vehicle and outputs the braking fluid pressure to the control unit 16.

As illustrated in FIG. 2, the linear motion conversion mechanism 14 is coupled to the piston 122 of the electrically powered cylinder device 12, and is driven by a rotational driving force (rotational motion) from the electric motor 11 to slidably move the piston 122 with respect to the cylinder 121. The linear motion conversion mechanism 14 of the present embodiment includes a ball screw 141 coupled to the piston 122 of the electrically powered cylinder device 12 as a linear moving portion, and a ball screw nut 142 screwed to the ball screw 141.

The ball screw 141 rotates with respect to the ball screw nut 142 by a rotational motion (rotational driving force) supplied from the electric motor 11, and relatively moves in the axial direction with respect to the ball screw nut 142. The ball screw nut 142 is supported so as to be relatively non-rotatable with respect to the hydraulic block 13. Thus, the ball screw 141 and the ball screw nut 142 convert the rotational motion of the electric motor 11, more specifically, the rotating shaft 111, into the linear motion of the ball screw 141. Therefore, the ball screw 141 serving as the linear moving portion performs linear motion together with the piston 122 of the electrically powered cylinder device 12.

As illustrated in FIG. 2, the power transmission unit 15 includes a driving gear 151 that rotates together with the rotating shaft 111 of the electric motor 11, more specifically, the rotating shaft 111 inserted through the rotating shaft accommodating portion 13A of the hydraulic block 13. In addition, the power transmission unit 15 includes a first driven gear 152 that engages with the driving gear 151, and a second driven gear 153 that is disposed coaxially with the first driven gear 152 through a shaft and transmits rotational motion (rotational driving force) to the ball screw 141 of the linear motion conversion mechanism 14. Thus, the power transmission unit 15 can transmit the rotation to the ball screw 141 of the linear motion conversion mechanism 14 while reducing the rotational speed of the rotating shaft 111 of the electric motor 11.

In the present embodiment, the first driven gear 152 is provided, and the power transmission unit 15 includes three gears. However, for example, the first driven gear 152 may be omitted, and the driving gear 151 and the second driven gear 153 may be directly engaged with each other.

Figure 5:
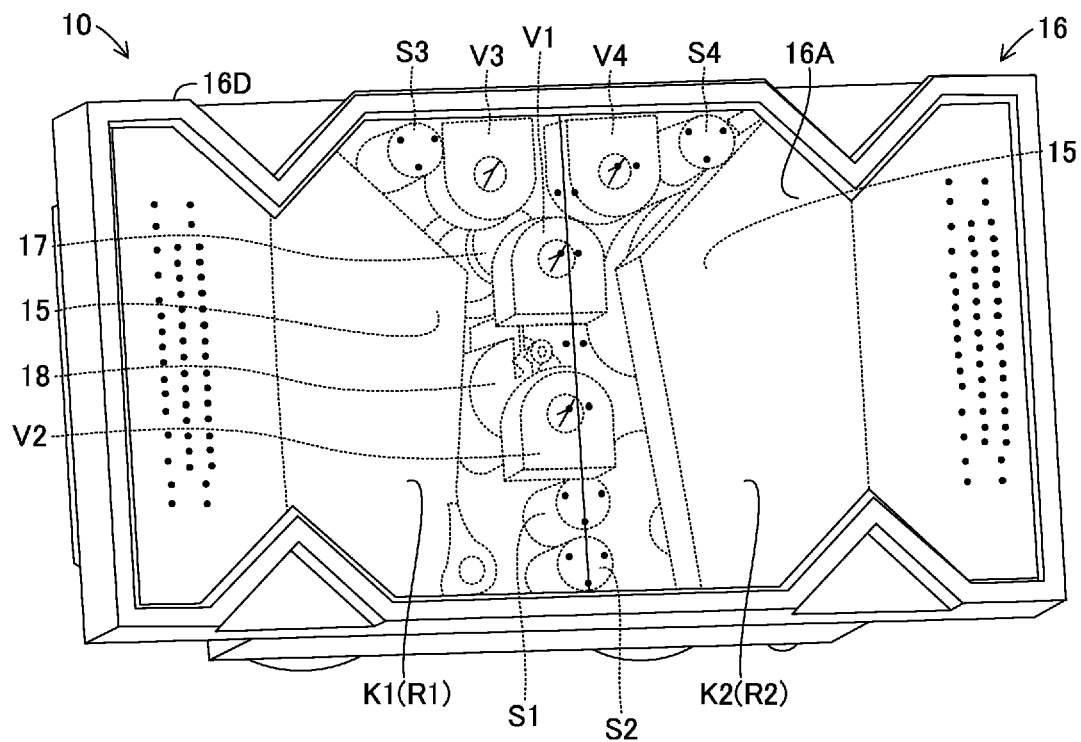
FIG. 5 is a perspective view for explaining a configuration of the control unit.
Figure 6:
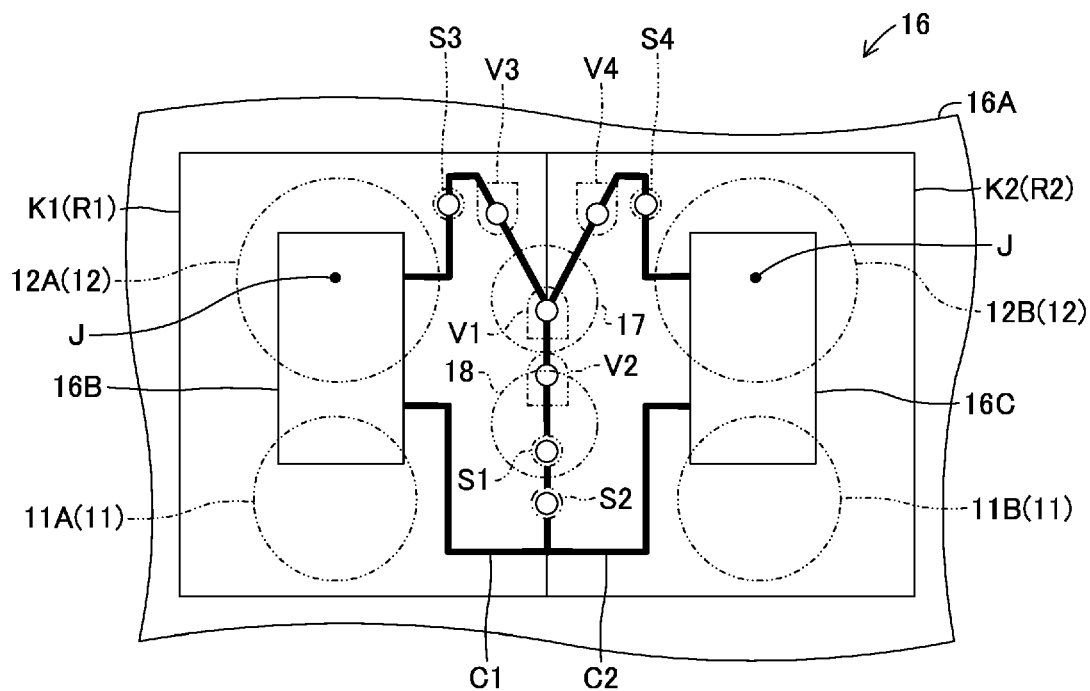
FIG. 6 is a diagram for explaining a configuration of a circuit board forming the control unit.

As illustrated in FIGS. 5 and 6, the control unit 16 of the present embodiment includes one circuit board 16A and as illustrated in FIG. 6, includes a first ECU 16B and a second ECU 16C assembled to the circuit board 16A. The circuit board 16A is accommodated and attached in a case 16D fixed at a corresponding position of the hydraulic block 13 so as to be perpendicular to the axis J of the electrically powered cylinder device 12. Note that "perpendicular" includes substantially perpendicular, that is, that which is intended to be perpendicular but also includes that which is slightly deviated from perpendicular due to tolerance, arrangement error, or the like. The circuit board 16A, that is, the control unit 16 and the electric motor 11 of the present embodiment are disposed on opposite sides to each other with the hydraulic block 13 in between in the direction of the axis J of the electrically powered cylinder device 12. Here, in the case 16D, a connector for enabling communication with the outside is provided in correspondence with each of the first ECU 16B and the second ECU 16C (see FIG. 1).

Each of the first ECU 16B and the second ECU 16C is a microcomputer including a CPU, a ROM, a RAM, and various interfaces as main configuring components. Then, as illustrated in FIG. 6, the first ECU 16B is disposed together with the first circuit C1 serving as an electric circuit for electrically connecting to the first electromagnetic valve V3 serving as a first element and the master cut valve V1 and the simulator cut valve V2 serving as third elements in the first sector K1 set on the circuit board 16A. Similarly, the second ECU 16C is disposed together with the second circuit C2 serving as an electric circuit for electrically connecting to the second electromagnetic valve V4 serving as a second element and the master cut valve V1 and the simulator cut valve V2 serving as third elements in the second sector K2 set on the circuit board 16A.

Note that the first circuit C1 includes a contact (indicated by a solid circle in FIG. 6) and a wiring pattern (substrate pattern) that electrically connects the first ECU 16B, the first electric motor 11A, the first electromagnetic valve V3, the first pressure sensor S3, the master cut valve V1, the simulator cut valve V2, the master pressure sensors S1, S2 and the stroke sensor. The second circuit C2 includes a contact (indicated by a solid circle in FIG. 6) and a wiring pattern (substrate pattern) that electrically connects the second ECU 16C, the second electric motor 11B, the second electromagnetic valve V4, the second pressure sensor S4, the master cut valve V1, the simulator cut valve V2, the master pressure sensors S1 and S2, and the stroke sensor.

Here, the first sector K1 set on the circuit board 16A is included in the first region R1 set to be parallel to the axis J (i.e., the normal direction of the first sector K1) of the electrically powered cylinder device 12. The second sector K2 set on the circuit board 16A is included in the second region R2 set to be parallel to the axis J (i.e., the normal direction of the second sector K2) of the electrically powered cylinder device 12. That is, the first electrically powered cylinder device 12A which is the first element is disposed so as to face the first sector K1 in which the first circuit C1 is formed (on the normal line of the first sector K1). Furthermore, the second electrically powered cylinder device 12B which is the second element is disposed so as to face the second sector K2 in which the second circuit C2 is formed (on the normal line of the second sector K2).

The first ECU 16B and the first circuit C1 disposed in the first sector K1, that is, the first region R1 control the operations of the first electric motor 11A (i.e., the first electrically powered cylinder device 12A) and the first electromagnetic valve V3 disposed in the first region R1, and acquire the detection value of the braking fluid pressure detected by the first pressure sensor S3 disposed in the first region R1. On the other hand, the second ECU 16C and the second circuit C2 disposed in the second sector K2, that is, the second region R2 control the operations of the second electric motor 11B (i.e., the second electrically powered cylinder device 12B) and the second electromagnetic valve V4 disposed in the second region R2, and acquire the detection value of the braking fluid pressure detected by the second pressure sensor S4 disposed in the second region R2.

Furthermore, the master cut valve V1 and the simulator cut valve V2 (includes a master pressure sensor and a stroke sensor, as necessary) disposed at the boundary between the first sector K1 (first region R1) and the second sector K2 (second region R2) or in the region between the first sector K1 (first region R1) and the second sector K2 (second region R2), that is, the central portion of the hydraulic block 13 are electrically connected to both the first circuit C1 and the second circuit C2, and the operations thereof can be controlled by both the first ECU 16B and the second ECU 16C. In the present embodiment, the master cut valve V1 and the simulator cut valve V2 are arranged at the boundary between the first sector K1 (first region R1) and the second sector K2 (second region R2).

As a result, for example, when an abnormality occurs in the first ECU 16B that controls the operations of the master cut valve V1 and the simulator cut valve V2 at the normal time, the second ECU 16C can control the operations of the master cut valve V1 and the simulator cut valve V2 in place of the first ECU 16B. That is, in the vehicle brake device 10 of the present embodiment, the master cut valve V1 and the simulator cut valve V2 are not provided in correspondence with the first ECU 16B and the second ECU 16C, respectively, and the first ECU 16B and the second ECU 16C can control the operations of the common master cut valve V1 and the simulator cut valve V2.

Thus, in the vehicle brake device 10 of the present embodiment, the number of the electromagnetic valves and the like, specifically, the master cut valve V1 and the simulator cut valve V2 can be reduced while having redundancy. As a result, reduction in size of the vehicle brake device 10 can be achieved, and the manufacturing cost and the like of the vehicle brake device 10 can be reduced.

As illustrated in FIGS. 3, 5, and 6, the master cylinder 17 serving as a cylinder device is accommodated in a master cylinder accommodating portion 13C formed in a central portion (a boundary between the first sector K1 (first region R1) and the second sector K2 (second region R2)) of the hydraulic block 13. The master cylinder 17 of the present embodiment is disposed so as to be parallel to the rotating shaft 111 of the electric motor 11 and the axis J of the electrically powered cylinder device 12. The master cylinder 17 is connected to a reservoir (not illustrated) that stores brake fluid through a liquid path T3 formed in the hydraulic block 13. A master piston (not illustrated) of the master cylinder 17 is coupled to a brake operation member (e.g., a brake pedal etc.). Thus, in the master cylinder 17, the master piston slides and moves according to the operation of the brake pedal or the like by the driver, and as a result, a braking fluid pressure (master pressure) corresponding to the position of the master piston is generated in a fluid pressure chamber defined by the master piston inside the master cylinder 17. The master cylinder 17 supplies the generated braking fluid pressure (master pressure) to the wheel cylinders provided in the first wheel (e.g., the left front wheel of the vehicle) and the second wheel (e.g., the right front right wheel of the vehicle) through a liquid path not illustrated.

As illustrated in FIGS. 3, 5, and 6, the stroke simulator 18 is accommodated in a stroke simulator accommodating portion 13D formed at a central portion of the hydraulic block 13. The stroke simulator 18 of the present embodiment is disposed so as to be parallel to the rotating shaft 111 of the electric motor 11 and the axis J of the electrically powered cylinder device 12. When the master cut valve V1 is in the cutoff state and the simulator cut valve V2 is in the communicating state, the stroke simulator 18 generates a reaction force (load) with respect to the operation of the brake pedal or the like by the driver.

In the vehicle brake device 10 of the present embodiment, the circuit board 16A of the control unit 16, that is, the first ECU 16B and the second ECU 16C are arranged so as to be perpendicular to the axis J of the electrically powered cylinder device 12 (the rotating shaft 111 of the electric motor 11). In this case, as illustrated with a two-dot chain line circle in FIG. 6, assume a case in which the electric motor 11 (the first electric motor 11A and the second electric motor 11B) and the electrically powered cylinder device 12 (the first electrically powered cylinder device 12A and the second electrically powered cylinder device 12B) are projected toward the circuit board 16A in the direction of the axis J of the electrically powered cylinder device 12 (the direction of the rotating shaft 111 of the electric motor 11). In this case, the sizes of the projection areas of the electric motor 11 (the first electric motor 11A, the second electric motor 11B) and the electrically powered cylinder device 12 (the first electrically powered cylinder device 12A, the second electrically powered cylinder device 12B) in the first sector K1 and the second sector K2 are not along the direction of the axis J of the electrically powered cylinder device 12 (the direction of the rotating shaft 111 of the electric motor 11) and are smaller than, for example, the projection area projected in the direction perpendicular to the axis J.

In particular, when the circuit board 16A (the control unit 16) is disposed so as to be perpendicular to the axis J of the electrically powered cylinder device 12 (the rotating shaft 111 of the electric motor 11), the projection area when the electric motor 11 and the electrically powered cylinder device 12 are projected is minimized in the first sector K1 and the second sector K2. When arranged (assembled) in the hydraulic block 13, the first electromagnetic valve V3 and the second electromagnetic valve V4 are generally arranged such that the projection with respect to the circuit board 16A does not overlap the projection of the electric motor 11 and the electrically powered cylinder device 12 with respect to the circuit board 16A. Therefore, when the projection areas of the electric motor 11 and the electrically powered cylinder device 12 in the first sector K1 and the second sector K2 are the minimum, it can be said that the arrangement range in which the first electromagnetic valve V3 and the second electromagnetic valve V4 can be arranged in the hydraulic block 13 is the maximum.

As a result, the degree of freedom in arranging (assembling) the first electromagnetic valve V3 and the second electromagnetic valve V4 in the hydraulic block 13 is improved.

Regarding the connection between the master cut valve V1, the simulator cut valve V2, the first electromagnetic valve V3, and the second electromagnetic valve V4 and the circuit board 16A, a hole needs to be formed as a contact in the circuit board 16A, and there exists an implementation restriction that arrangement of elements and wiring (copper foil pattern) of an electric circuit needs to be avoided around the provided hole (contact). If the master cut valve V1, the simulator cut valve V2, the first electromagnetic valve V3, and the second electromagnetic valve V4 are arranged at the central portion of the circuit board 16A, a hole (contact) is provided at the central part of the circuit board 16A. In this case, arrangement and wiring of elements in an electric circuit other than the drive circuit of the master cut valve V1, the simulator cut valve V2, the first electromagnetic valve V3, and the second electromagnetic valve V4 become complicated, and as a result, the circuit board 16A may be increased in size.

On the other hand, in the present example, the master cut valve V1 and the simulator cut valve V2 can be arranged at the boundary between the first sector K1 (first region R1) and the second sector K2 (second region R2). Furthermore, the first electromagnetic valve V3 can be arranged at the peripheral edge portion of the first sector K1, and the second electromagnetic valve V4 can be arranged at the peripheral edge portion of the second sector K2. That is, in the present example, as described above, the degree of freedom in the arrangement of the master cut valve V1, the simulator cut valve V2, the first electromagnetic valve V3, and the second electromagnetic valve V4 is high in the hydraulic block 13, and thus the arrangement described above can be realized.

In addition, for example, in a case where the circuit board 16A (the control unit 16) is arranged in parallel with the axis J of the electrically powered cylinder device 12 (the rotating shaft 111 of the electric motor 11), the projection area of the electrically powered cylinder device 12 to the circuit board 16A is larger than that in a case where the circuit board is arranged perpendicularly. In this case, when the first electromagnetic valve V3 and the second electromagnetic valve V4 are arranged so as to avoid projection of the electrically powered cylinder device 12 onto the circuit board 16A, the degree of freedom in the arrangement of the first electromagnetic valve V3 and the second electromagnetic valve V4 decreases. Alternatively, when the first electromagnetic valve V3 and the second electromagnetic valve V4 are arranged on the projection of the electrically powered cylinder device 12 onto the circuit board 16A, it is necessary to increase the thickness of the hydraulic block 13 between the circuit board 16A and the electrically powered cylinder device 12 to arrange the first electromagnetic valve V3 and the second electromagnetic valve V4. In these cases, the hydraulic block 13 increases in size.

On the other hand, in the vehicle brake device 10, the degree of freedom in the arrangement of the first electromagnetic valve V3 and the second electromagnetic valve V4 with respect to the hydraulic block 13 can be improved, as described above. As a result, in the vehicle brake device 10, the circuit board 16A can be arranged perpendicular to the axis J of the electrically powered cylinder device 12 (the rotating shaft 111 of the electric motor 11), and the first electromagnetic valve V3 and the second electromagnetic valve V4 can be arranged so as to be parallel to the rotating shaft 111 of the electric motor 11 and the axis J of the electrically powered cylinder device 12. Thus, a space for arranging the first electromagnetic valve V3 and the second electromagnetic valve V4 does not need to be separately secured, that is, the hydraulic block 13 does not need to be enlarged, reduction in size of the hydraulic block 13 can be achieved and reduction in size of the circuit board 16A (the control unit 16) also can be achieved. That is, reduction in size of the vehicle brake device 10 can be achieved.

In addition, since the first electromagnetic valve V3 and the second electromagnetic valve V4 are opening/closing means of the liquid path provided inside the hydraulic block 13, the arrangement of the first electromagnetic valve V3 and the second electromagnetic valve V4 in the hydraulic block 13 and the structure of the liquid path affect each other. Since the degree of freedom in arranging the first electromagnetic valve V3 and the second electromagnetic valve V4 in the hydraulic block 13 is improved, the configuration of the liquid path of the hydraulic block 13 can be simplified, and thus the hydraulic block 13 can be reduced in size.

The distance to the circuit board 16A (the control unit 16) facing each other on the axes of the first electromagnetic valve V3 and the second electromagnetic valve V4 can be shortened by arranging the first electromagnetic valve V3 and the second electromagnetic valve V4 so as to be parallel to the axis J of the electrically powered cylinder device 12 (the rotating shaft 111 of the electric motor 11). Thus, reduction in size of the vehicle brake device 10 can also be achieved.

In addition, in the vehicle brake device 10 of the present embodiment, the degree of freedom in arranging the first electromagnetic valve V3 and the second electromagnetic valve V4, and the first pressure sensor S3 and the second pressure sensor S4 can be improved, as described above. As a result, in the circuit board 16A, the first circuit C1 formed in the first sector K1 and the second circuit C2 formed in the second sector K2 can be made symmetrical with respect to, for example, the boundary between the first sector K1 (first region R1) and the second sector K2 (second region R2) as illustrated in FIG. 6.

Thus, in the development of the vehicle brake device 10, for example, after the first circuit C1 on the first sector K1 (first region R1) side is designed, the second circuit C2 formed in the second sector K2 (second region R2) can be easily designed by being formed to be a symmetrical shape of the first circuit C1. In addition, since the first circuit C1 and the second circuit C2 are symmetric with each other in manufacturing the circuit board 16A, the circuit board can be easily manufactured. Therefore, the development cost and the manufacturing cost required for the development of the first circuit C1 and the second circuit C2 in the circuit board 16A can be reduced.

Furthermore, in the vehicle brake device 10 of the present embodiment, the master cylinder 17 and the stroke simulator 18, which are heavy objects, can be disposed at the central portion of the hydraulic block 13, that is, at the boundary between the first sector K1 (first region R1) and the second sector K2 (second region R2). Thus, the weight balance in the vehicle brake device 10 can be optimized.

As can be understood from the above description, the vehicle brake device 10 of the present embodiment includes the first electric motor 11A, the first electrically powered cylinder device 12A, the first electromagnetic valve V3, and the first pressure sensor S3 serving as electric first elements that adjust the braking force applied to the first wheel of the vehicle (e.g., the left front wheel of the vehicle), and the second electric motor 11B, the second electrically powered cylinder device 12B, the second electromagnetic valve V4, and the second pressure sensor S4 serving as electric second elements that adjust the braking force applied to the second wheel of the vehicle (e.g., the right front wheel of the vehicle). Furthermore, the vehicle brake device 10 includes a circuit board 16A on which an electric circuit for controlling the first electric motor 11A, the first electrically powered cylinder device 12A, the first electromagnetic valve V3, and the first pressure sensor S3, as well as the second electric motor 11B, the second electrically powered cylinder device 12B, the second electromagnetic valve V4, and the second pressure sensor S4 is formed, and a first sector K1 in which a first circuit C1 for controlling the first electric motor 11A (the first electrically powered cylinder device 12A), the first electromagnetic valve V3, and the first pressure sensor S3 is formed and a second sector K2 in which a second circuit C2 for controlling the second electric motor 11B (the second electrically powered cylinder device 12B), the second electromagnetic valve V4, and the second pressure sensor S4 is formed are arranged. In the vehicle brake device 10, the first electric motor 11A, the first electrically powered cylinder device 12A, the first electromagnetic valve V3, and the first pressure sensor S3 controlled only by the first circuit C1 are arranged to face the first sector K1, and the second electric motor 11B, the second electrically powered cylinder device 12B, the second electromagnetic valve V4, and the second pressure sensor S4 controlled only by the second circuit C2 are arranged to face the second sector K2.

According to this, the first electric motor 11A, the first electrically powered cylinder device 12A, the first electromagnetic valve V3, and the first pressure sensor S3, which are first elements, are disposed so as to face the first sector K1 in which the first circuit C1 is formed, and the second electric motor 11B, the second electrically powered cylinder device 12B, the second electromagnetic valve V4, and the second pressure sensor S4, which are second elements, are disposed so as to face the second sector K2 in which the second circuit C2 is formed. As a result, the first electric motor 11A (the first electrically powered cylinder device 12A) electrically connected to and controlled by the first circuit C1, the first electromagnetic valve V3, and the first pressure sensor S3 can be disposed close to the first circuit C1, and the second electric motor 11B (the second electrically powered cylinder device 12B) electrically connected to and controlled by the second circuit C2, the second electromagnetic valve V4, and the second pressure sensor S4 can be disposed close to the second circuit C2.

That is, the distance between the first circuit C1 and the first electric motor 11A (the first electrically powered cylinder device 12A), the first electromagnetic valve V3, and the first pressure sensor S3 can be shortened in the first region R1 including the first sector K1, and the distance between the second circuit C2 and the second electric motor 11B (the second electrically powered cylinder device 12B), the second electromagnetic valve V4, and the second pressure sensor S4 can be shortened in the second region R2 including the second sector K2. As a result, the vehicle brake device 10 can be reduced in size.

In addition, if the first element (the first electric motor 11A, first electrically powered cylinder device 12A, first electromagnetic valve V3, and first pressure sensor S3) provided in the first region R1 is controlled by the second circuit C2 provided in the second region R2, the first element needs to be connected to the first circuit C1 provided in the first region R1, in which case, wiring from the first region R1 to the second region R2 is required in order to shorten the distance between the first element (the first electric motor 11A, first electrically powered cylinder device 12A, first electromagnetic valve V3, and first pressure sensor S3) and the circuit board 16A. As a result, the wiring of the electric circuit in the circuit board 16A becomes complicated, which may lead to an increase in size of the circuit board 16A. If the first element (the first electric motor 11A, first electrically powered cylinder device 12A, first electromagnetic valve V3, and first pressure sensor S3) is directly connected to the second circuit C2, the first element (the first electric motor 11A, first electrically powered cylinder device 12A, first electromagnetic valve V3, and first pressure sensor S3) and the second region R2 of the second circuit C2 are separated from each other, and hence the connection mechanism increases in size, and the vehicle brake device 10 increases in size. In the present disclosure, the wiring of the electric circuit (including the first circuit C1 and the second circuit C2) can be simplified while shortening the distance between the first element (the first electric motor 11A, first electrically powered cylinder device 12A, first electromagnetic valve V3, and first pressure sensor S3) and the circuit board 16A, and thus the circuit board 16A can be reduced in size.

In this case, the master cut valve V1 and the simulator cut valve V2 serving as the third elements controlled by both the first circuit C1 and the second circuit C2 are disposed so as to face the boundary between the first sector K1 and the second sector K2 or so as to face the region between the first sector K1 and the second sector K2. Note that in the present embodiment, the master cut valve V1 and the simulator cut valve V2 serving as the third elements controlled by both the first circuit C1 and the second circuit C2 are arranged to face the boundary between the first sector K1 and the second sector K2.

According to this, the master cut valve V1 and the simulator cut valve V2 controlled by both circuits of the first circuit C1 and the second circuit C2 can be arranged at the boundary (alternatively, a region between the first region R1 and the second region R2) between the first sector K1 (alternatively, the first region R1) and the second sector K2 (alternatively, the second region R2). As a result, the distances between the first circuit C1 and the second circuit C2 and the master cut valve V1 and the simulator cut valve V2 can be uniformly shortened. Therefore, the circuit board 16A on which the first sector K1 and the second sector K2 are arranged side by side can be reduced in size, and the vehicle brake device 10 can be reduced in size.

Furthermore, in these cases, the circuit board 16A has the first sector K1 and the second sector K2 are arranged side by side and includes a wheel cylinder provided on the first wheel (e.g., the left front wheel of the vehicle) and the second wheel (e.g., the right front wheel of the vehicle), and a master cylinder 17 serving as a cylinder device which is connected to the wheel cylinder and in which a fluid pressure corresponding to a position of a piston sliding in a cylinder is generated in a fluid pressure chamber defined by the cylinder and the piston, where the master cylinder 17 is disposed at a boundary between the first sector K1 and the second sector K2 or at a boundary between the first sector K1 and the second sector K2 in a region between the first sector K1 and the second sector K2.

According to this, the first electric motor 11A, the first electrically powered cylinder device 12A, the first electromagnetic valve V3, and the first pressure sensor S3 are disposed so as to face the first sector K1 (alternatively, in the first region R1), the second electric motor 11B, the second electrically powered cylinder device 12B, the second electromagnetic valve V4, and the second pressure sensor S4 are disposed so as to face the second sector K2 (alternatively, in the second region R2), and furthermore, the master cylinder 17 (which may include the stroke simulator 18) can be disposed at the boundary between the first sector K1 (alternatively, the first region R1) and the second sector K2 (alternatively, the second region R2). Thus, the weight balance in the vehicle brake device 10 can be optimized.

2. Modified Example

The vehicle brake device 10 of the embodiment described above is assembled to the hydraulic block 13 such that the electric motor 11 is below the electrically powered cylinder device 12 in the vertical direction in the posture of being assembled to the vehicle. However, the arrangement of the electric motor 11 and the electrically powered cylinder device 12 assembled to the hydraulic block 13 is not limited. For example, in a posture in which the vehicle brake device 10 is assembled to the vehicle, the electrically powered cylinder device 12 can be assembled to the hydraulic block 13 so as to be below the electric motor 11 in the vertical direction.

In addition, in the vehicle brake device 10 according to the embodiment described above, the power transmission unit 15 is arranged between the hydraulic block 13 and the control unit 16. However, the arrangement of the power transmission unit 15 is not limited. For example, it is also possible to configure such that the power transmission unit 15 is assembled to the hydraulic block 13 on the side opposite to the control unit 16, and the rotational motion (rotational driving force) of the rotating shaft 111 of the electric motor 11 is transmitted to the linear motion conversion mechanism 14. Note that in this case, it goes without saying that the arrangement direction of the electric motor 11 and the arrangement direction of the electrically powered cylinder device 12 are changed in accordance with the arrangement of the power transmission unit 15.

In the embodiment described above, the ball screw 141 is used as the linear moving portion of the linear motion conversion mechanism 14, and the ball screw nut 142 screwed to the ball screw 141 is used so as to transmit the rotational motion to the ball screw 141. However, as the linear motion conversion mechanism, any configuration such as a combination of a roller screw and a roller screw nut, a combination of a trapezoidal screw or a sliding screw and a nut, or the like may be adopted as long as the rotational motion can be converted into the linear motion.

Furthermore, in the embodiment described above, in the circuit board 16A of the control unit 16, the first sector K1 and the second sector K2 are set, the first circuit C1 that controls the first electromagnetic valve V3 and the first pressure sensor S3 serving as the first elements is arranged so as to face the first sector K1, and the second circuit C2 that controls the second electromagnetic valve V4 and the second pressure sensor S4 serving as the second elements is arranged so as to face the second sector K2. In the embodiment described above, the first electromagnetic valve V3 and the first pressure sensor S3 controlled only by the first circuit C1 are disposed in the first region R1 including the first sector K1, and the second electromagnetic valve V4 and the second pressure sensor S4 controlled only by the second circuit C2 are disposed in the second region R2 including the second sector K2. However, it is of course possible to set the first region R1 and the second region R2 without setting the first sector K1 and the second sector K2 in the circuit board 16A.

In the embodiment described above, the first sector K1 (first region R1) and the second sector K2 (second region R2) are set for one circuit board 16A of the control unit 16. However, the circuit board 16A may be configured by a plurality of substrates, and the first sector K1 (first region R1) and the second sector K2 (second region R2) may be set.

Furthermore, in the embodiment described above, the circuit board 16A has a range wider than the total range of the first sector K1 and the second sector K2. However, the total range of the first sector K1 and the second sector K2 may coincide with the range of the circuit board 16A.

The invention claimed is:

1. A vehicle brake device comprising:
   an electric first element that adjusts braking force applied to a first wheel of a vehicle;
   an electric second element that adjusts braking force applied to a second wheel of the vehicle; and
   a circuit board on which an electric circuit that controls the first element and the second element is printed, the circuit board including a first sector in which a first circuit of the electric circuit that controls the first element is printed and a second sector in which a second circuit that controls the second element is printed; wherein
   the first element controlled only by the first circuit is arranged to face the first sector;
   the second element controlled only by the second circuit is arranged to face the second sector;
   the vehicle brake device further comprises a third element controlled by both the first circuit and the second circuit, the third element being disposed so as to face perpendicular to a boundary between the first sector and the second sector or so as to face perpendicular to a region between the first sector and the second sector;
   the circuit board has the first sector and the second sector arranged side by side;
   the vehicle brake device includes a master cylinder device connected to wheel cylinders provided on each of the first wheel and the second wheel, the master cylinder device comprising a fluid pressure chamber defined by a cylinder and a piston such that a fluid pressure corresponding to a position of the piston sliding in the cylinder is generated in the fluid pressure chamber; and
   the master cylinder device is disposed so as to face the boundary between the first sector and the second sector or so as to face the region between the first sector and the second sector.

2. The vehicle brake device according to claim 1, wherein
   the first element includes a first electric motor controlled only by the first circuit, and a first electrically powered cylinder device that is driven by the first electric motor; and
   the second element includes a second electric motor controlled only by the second circuit, and a second electrically powered cylinder device that is driven by the second electric motor.

* * * * *